United States Patent
Melvin

(10) Patent No.: US 8,301,753 B1
(45) Date of Patent: Oct. 30, 2012

(54) ENDPOINT ACTIVITY LOGGING

(75) Inventor: Stephen Waller Melvin, San Francisco, CA (US)

(73) Assignee: Nosadia Pass NV, Limited Liability Company, Dover, DE (US)

(*) Notice: Subject to any disclaimer, the term of this patent is extended or adjusted under 35 U.S.C. 154(b) by 411 days.

(21) Appl. No.: 11/426,687

(22) Filed: Jun. 27, 2006

(51) Int. Cl.
*G06F 15/173* (2006.01)

(52) U.S. Cl. .......................................... 709/224

(58) Field of Classification Search ................... 709/224
See application file for complete search history.

(56) References Cited

U.S. PATENT DOCUMENTS

| Patent No. | | Date | Inventor | Page |
|---|---|---|---|---|
| 5,450,593 | A | 9/1995 | Howell et al. | |
| 6,266,679 | B1 | 7/2001 | Szalwinski et al. | |
| 6,650,639 | B2 * | 11/2003 | Doherty et al. | 370/389 |
| 6,826,690 | B1 | 11/2004 | Hind et al. | |
| 6,886,095 | B1 | 4/2005 | Hind et al. | |
| 6,978,376 | B2 | 12/2005 | Giroux et al. | |
| 6,985,956 | B2 * | 1/2006 | Luke et al. | 709/229 |
| 6,986,046 | B1 | 1/2006 | Tuvell et al. | |
| 7,028,335 | B1 * | 4/2006 | Borella et al. | 726/11 |
| 7,089,293 | B2 * | 8/2006 | Grosner et al. | 709/217 |
| 7,096,204 | B1 | 8/2006 | Chen et al. | |
| 7,114,070 | B1 | 9/2006 | Willming et al. | |
| 7,127,524 | B1 * | 10/2006 | Renda et al. | 709/245 |
| 7,260,649 | B1 * | 8/2007 | Somasundaram et al. | 709/245 |
| 7,313,145 | B1 * | 12/2007 | Bradd et al. | 370/401 |
| 7,334,125 | B1 | 2/2008 | Pellacuru | |
| 7,668,954 | B1 | 2/2010 | Melvin | |
| 7,680,830 | B1 | 3/2010 | Ohr et al. | |
| 7,716,489 | B1 | 5/2010 | Brandt et al. | |
| 7,752,663 | B2 * | 7/2010 | Nakakoji et al. | 726/22 |
| 7,788,456 | B1 | 8/2010 | Park | |
| 2002/0073325 | A1 | 6/2002 | Ho et al. | |
| 2002/0081039 | A1 | 6/2002 | Funahashi | |
| 2002/0152380 | A1 | 10/2002 | O'Shea et al. | |
| 2002/0159459 | A1 * | 10/2002 | Nagatomo et al. | 370/392 |
| 2002/0174031 | A1 * | 11/2002 | Weiss | 705/26 |
| 2003/0055808 | A1 | 3/2003 | Bhat | |
| 2003/0076830 | A1 * | 4/2003 | Asano | 370/392 |
| 2003/0088680 | A1 | 5/2003 | Nachenberg et al. | |
| 2003/0142680 | A1 * | 7/2003 | Oguchi | 370/400 |
| 2003/0145119 | A1 * | 7/2003 | Bender et al. | 709/249 |
| 2003/0149899 | A1 | 8/2003 | Boden et al. | |
| 2003/0154306 | A1 * | 8/2003 | Perry | 709/245 |
| 2003/0190046 | A1 | 10/2003 | Kamerman et al. | |
| 2003/0217151 | A1 | 11/2003 | Roese et al. | |
| 2003/0227930 | A1 * | 12/2003 | Choi et al. | 370/401 |
| 2003/0233445 | A1 * | 12/2003 | Levy et al. | 709/224 |

(Continued)

OTHER PUBLICATIONS

Hines, Eric et al. "Complete Reference Guide to Creating a Secure Remote Log Server." Jan. 4, 2002. pp. 1-16.*

(Continued)

*Primary Examiner* — Imad Hussain
(74) *Attorney, Agent, or Firm* — Knobbe, Martens, Olson & Bear, LLP

(57) ABSTRACT

The ability to identify a specific machine associated with activity taking place on the Internet is provided. This involves recording the association between MAC addresses, which are uniquely associated with endpoints, and local IP addresses, the recording of the association between local IP addresses and port numbers with public IP addresses and port numbers, and the recording of public IP addresses and source port numbers associated with public activity. By recording this information and correlating it, in real-time or in a post-processing step, the specific machine associated with public activity can be determined.

13 Claims, 8 Drawing Sheets

U.S. PATENT DOCUMENTS

| | | | |
|---|---|---|---|
| 2004/0002877 A1 | 1/2004 | Angelo et al. | |
| 2004/0052216 A1* | 3/2004 | Roh | 370/252 |
| 2004/0053601 A1 | 3/2004 | Frank et al. | |
| 2004/0064454 A1 | 4/2004 | Ross et al. | |
| 2004/0081150 A1* | 4/2004 | Chiang et al. | 370/392 |
| 2004/0104805 A1 | 6/2004 | Sakamoto et al. | |
| 2004/0117438 A1* | 6/2004 | Considine et al. | 709/203 |
| 2004/0193906 A1* | 9/2004 | Dar et al. | 713/200 |
| 2004/0199791 A1* | 10/2004 | Poletto et al. | 713/201 |
| 2004/0213272 A1* | 10/2004 | Nishi et al. | 370/401 |
| 2004/0243837 A1 | 12/2004 | Fredette et al. | |
| 2004/0250077 A1 | 12/2004 | Jang et al. | |
| 2004/0260763 A1* | 12/2004 | Bhattacharya et al. | 709/202 |
| 2005/0008158 A1 | 1/2005 | Huh et al. | |
| 2005/0013280 A1* | 1/2005 | Buddhikot et al. | 370/349 |
| 2005/0025157 A1 | 2/2005 | Pennec et al. | |
| 2005/0050004 A1 | 3/2005 | Sheu et al. | |
| 2005/0055518 A1 | 3/2005 | Hochberg et al. | |
| 2005/0086468 A1 | 4/2005 | Meandzija et al. | |
| 2005/0108523 A1 | 5/2005 | West | |
| 2005/0114708 A1 | 5/2005 | DeStefano et al. | |
| 2005/0141296 A1 | 6/2005 | Zhang | |
| 2005/0166051 A1 | 7/2005 | Buer | |
| 2005/0177750 A1 | 8/2005 | Gasparini et al. | |
| 2005/0220100 A1* | 10/2005 | Kawabe | 370/389 |
| 2005/0228876 A1 | 10/2005 | Malik | |
| 2005/0235044 A1* | 10/2005 | Tazuma | 709/217 |
| 2005/0256806 A1 | 11/2005 | Tien et al. | |
| 2006/0026690 A1 | 2/2006 | Yu et al. | |
| 2006/0031942 A1 | 2/2006 | Jones et al. | |
| 2006/0047659 A1 | 3/2006 | Yagiura | |
| 2006/0056397 A1* | 3/2006 | Aizu et al. | 370/352 |
| 2006/0095772 A1 | 5/2006 | Bell et al. | |
| 2006/0117314 A1 | 6/2006 | Sato | |
| 2006/0136987 A1* | 6/2006 | Okuda | 726/1 |
| 2006/0140182 A1 | 6/2006 | Sullivan et al. | |
| 2006/0168446 A1 | 7/2006 | Ahonen et al. | |
| 2006/0190723 A1 | 8/2006 | Benson | |
| 2006/0195889 A1 | 8/2006 | Pfleging et al. | |
| 2006/0200556 A1 | 9/2006 | Brave et al. | |
| 2006/0203721 A1* | 9/2006 | Hsieh et al. | 370/229 |
| 2006/0206925 A1 | 9/2006 | Dillaway et al. | |
| 2006/0206931 A1 | 9/2006 | Dillaway et al. | |
| 2006/0218273 A1 | 9/2006 | Melvin | |
| 2006/0224717 A1* | 10/2006 | Sawai et al. | 709/223 |
| 2006/0242687 A1 | 10/2006 | Thione et al. | |
| 2006/0248083 A1 | 11/2006 | Sack et al. | |
| 2006/0251253 A1 | 11/2006 | Kappler et al. | |
| 2007/0021093 A1 | 1/2007 | Chu | |
| 2007/0038857 A1 | 2/2007 | Gosnell | |
| 2007/0050362 A1 | 3/2007 | Low et al. | |
| 2007/0079113 A1 | 4/2007 | Kulkarni et al. | |
| 2007/0097976 A1* | 5/2007 | Wood et al. | 370/392 |
| 2007/0110017 A1* | 5/2007 | Fulknier et al. | 370/338 |
| 2007/0130321 A1 | 6/2007 | O'Shaughnessy | |
| 2007/0136580 A1 | 6/2007 | Anand et al. | |
| 2007/0245029 A1* | 10/2007 | Ha et al. | 709/228 |
| 2007/0256121 A1 | 11/2007 | Hassan et al. | |
| 2007/0282859 A1 | 12/2007 | Charvet | |
| 2007/0283194 A1 | 12/2007 | Villella et al. | |
| 2008/0307488 A1 | 12/2008 | Hammond et al. | |
| 2009/0129386 A1 | 5/2009 | Rune | |
| 2009/0158042 A1 | 6/2009 | Calhoun et al. | |
| 2009/0293106 A1 | 11/2009 | Gray et al. | |
| 2011/0185055 A1* | 7/2011 | Nappier et al. | 709/224 |

OTHER PUBLICATIONS

Office Action in U.S. Appl. No. 11/426,699 Dated Feb. 24, 2009.
Office Action in U.S. Appl. No. 11/426,711 Dated Mar. 4, 2009.
Office Action in U.S. Appl. No. 11/426,711 Dated Nov. 24, 2010.
Wikipedia Entry for "Server Log", retrieved on Mar. 1, 2010.

* cited by examiner

ENDPOINT ACTIVITY LOGGING

RELATED APPLICATIONS

This application is related to co-pending application Ser. No. 11/426,699, entitled "Unique Identifier Validation" and co-pending application Ser. No. 11/426,711, entitled "Remote Log Repository With Access Policy," both of which are incorporated herein by reference.

FIELD OF THE INVENTION

This invention relates to the field of network monitoring, and more particularly to the logging of access to and activity on a computerized network such as the Internet.

BACKGROUND

It is a usual practice for companies providing access to the Internet and for companies providing content and services on the Internet to generate logs of access and activity. Some examples of how logs are used are: for debugging and troubleshooting, detection and monitoring of abuse, statistical analysis, demographic analysis, report generation and other general business purposes.

FIG. 1 illustrates a typical environment in which a Web Server on the Internet logs activity. User 110 represents a user operating a browser and connected to the Internet 120. Web Server 130 is a web server connected to the Internet 120 and storing web pages for public viewing. When User 110, through the browser running on their computer, requests a web page stored on Web Server 130, a HTML document is delivered to the browser and displayed to User 110. In addition, a record is made of this activity in Access Log 140. A web server activity log will typically contain information regarding the access, but not the actual content of the access itself. For example, a web server log generally records the originating IP address, the name of the document that was requested and the number of bytes that were transferred to the client machine. It is common to record in an access log file a record of each access.

The Apache Software Foundation is an organization that supports an open-source web server known as Apache HTTP Server Project. Documentation and software for the Apache HTTP Server Project are located at http://httpd.apache.org. The Apache web site indicates that Apache has been the most popular web server on the Internet since April 1996, and as of 2005 represents more than 70% of the web sites on the Internet. The document entitled "Log Files" available on the Apache web site at: http://httpd.apache.org/docs/2.2/logs.html, incorporated herein by reference, describes several log file formats. Log file formats in use today, such as those described in the document referenced above, record the originating IP address of each machine that requests a document.

In cases such as FIG. 1 in which User 110 is directly connected to the Internet 120, the originating IP address is sufficient to identify the machine at which the request originated. However this is not the case in other scenarios. FIG. 2 illustrates a more common situation in which User Computer 210 is located on Local Network 220 behind NAT Gateway 230. Typically the IP addresses in use on Local Network 230 are unregistered or un-routable addresses that can be used within an enterprise but cannot be used on the public Internet. Un-routable addresses are addresses that have been set aside in the ranges 10.0.0.0 to 10.255.255.255, 172.16.0.0 to 172.31.255.255 and 192.168.0.0 to 192.168.255.255. IP addresses in this range may be freely used within a private network as they are guaranteed to be unused and unusable on the public Internet. NAT Gateways are used to convert packets coming from un-routable IP addresses into packets with addresses valid on the public Internet. This scheme is utilized to allow many machines to be used on an internal network without tying up as many public IP addresses, which are global resources.

In particular, NAT Gateway 230 operates a function known as Network Address Translation (NAT), which translates internal network addresses into external network addresses. Thus, a packet originating from User Computer 210 is translated by NAT Gateway 230 into another packet with a different source IP address and transmitted to Web Server 260 across the Internet 250. A return packet from Web Server 250 to User 210 will be transmitted to NAT Gateway 230, which will translate the packet into a different packet with the destination IP address for User Computer 210. The operation of NAT Gateways on the Internet is well known and in wide use today.

Frequently internal networks allocate IP addresses using a protocol known as DHCP. This requires the use of a DHCP Server 240 attached to Local Network 220. Briefly, the DHCP protocol involves the allocation of IP address upon request by machines on the local network. For example, when User Computer 210 powers up, it will request an IP address and DHCP Server 220 will allocate one. This operation is known as a "lease" and generally has an expiration time associated with it. The DHCP protocol generally requires periodic communication between User Computer 210 and DHCP Server 240 in order for User 210 to continue to be allowed to use the IP address to which it has been granted.

Many machines may exist on Local Network 220, and there may be multiple NAT Gateways within a large enterprise. This means that a request for a document on the Internet originating from a browser on a user's machine may be translated multiple times before it reaches the web server that is hosting the document. Thus, Access Log 270 that is recorded by Web Server 260 is insufficient to identify the specific machine that actually made the request.

There may be many situations in which it is desirable to identify a specific machine associated with activity on the Internet. These include debugging, detection of abuse, network integrity monitoring, billing, and if required by applicable laws. What is needed is an improved method for activity monitoring in which the specific endpoint associated with activity can be determined.

BRIEF SUMMARY OF THE INVENTION

The present invention provides the ability to identify a specific machine associated with activity taking place on the Internet. This involves recording the association between MAC addresses, which are uniquely associated with endpoints, and local IP addresses, the recording of the association between local IP addresses and port numbers with public IP addresses and port numbers, and the recording of public IP addresses and source port numbers associated with public activity. By recording this information and correlating it, in real-time or in a post-processing step, the specific machine associated with public activity can be determined.

DETAILED DESCRIPTION

Figure 1:
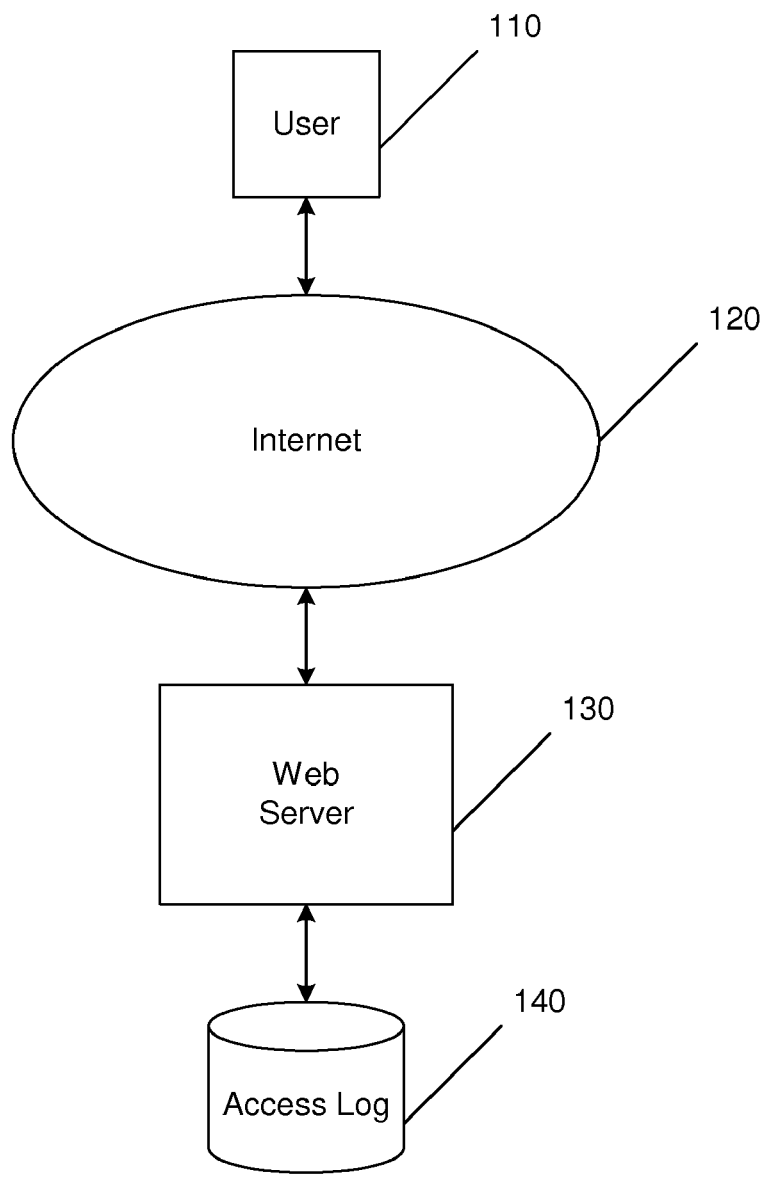
FIG. 1 illustrates a prior art interconnection and logging mechanism.
Figure 2:
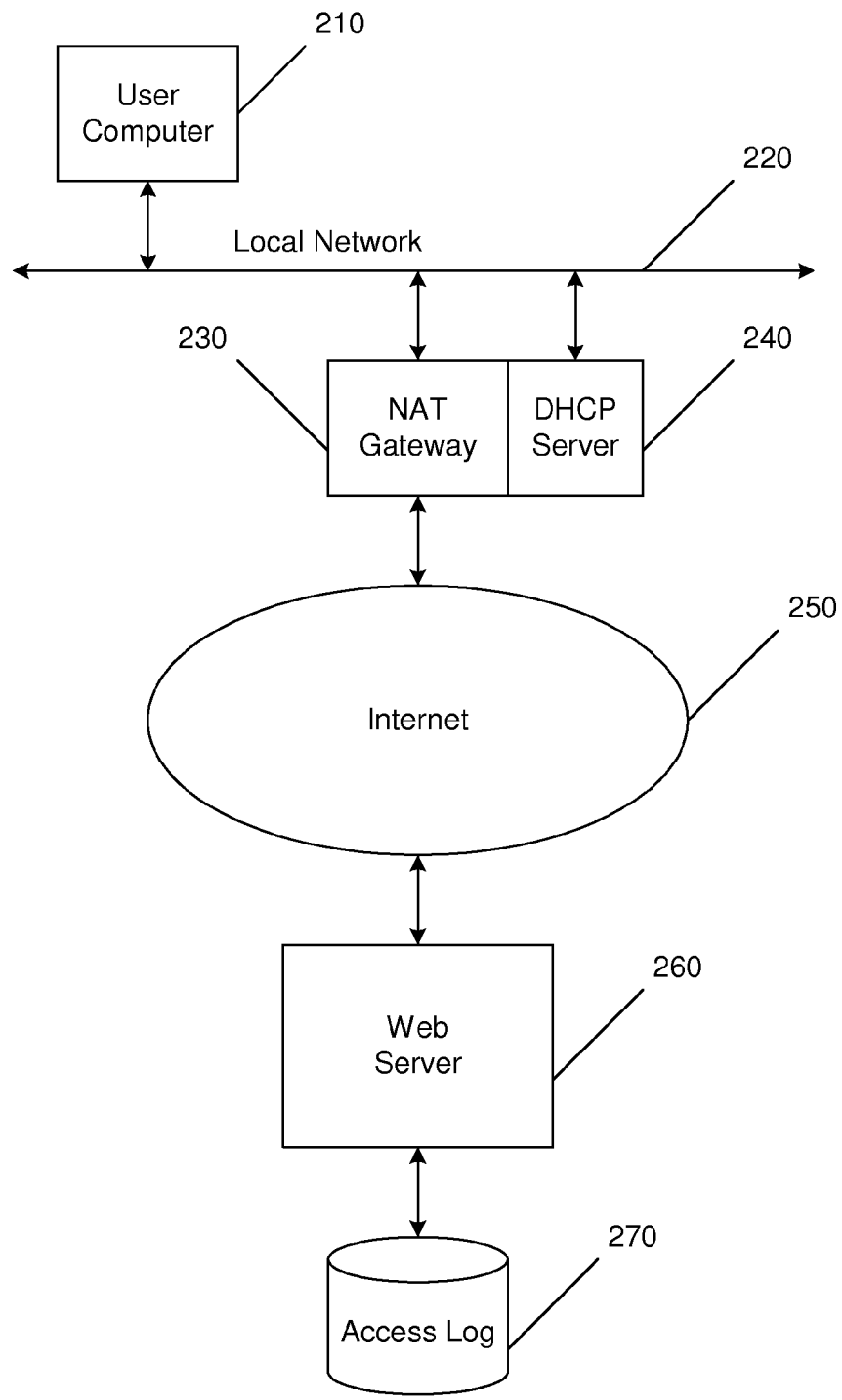
FIG. 2 illustrates a prior art interconnection and logging mechanism.
Figure 3:
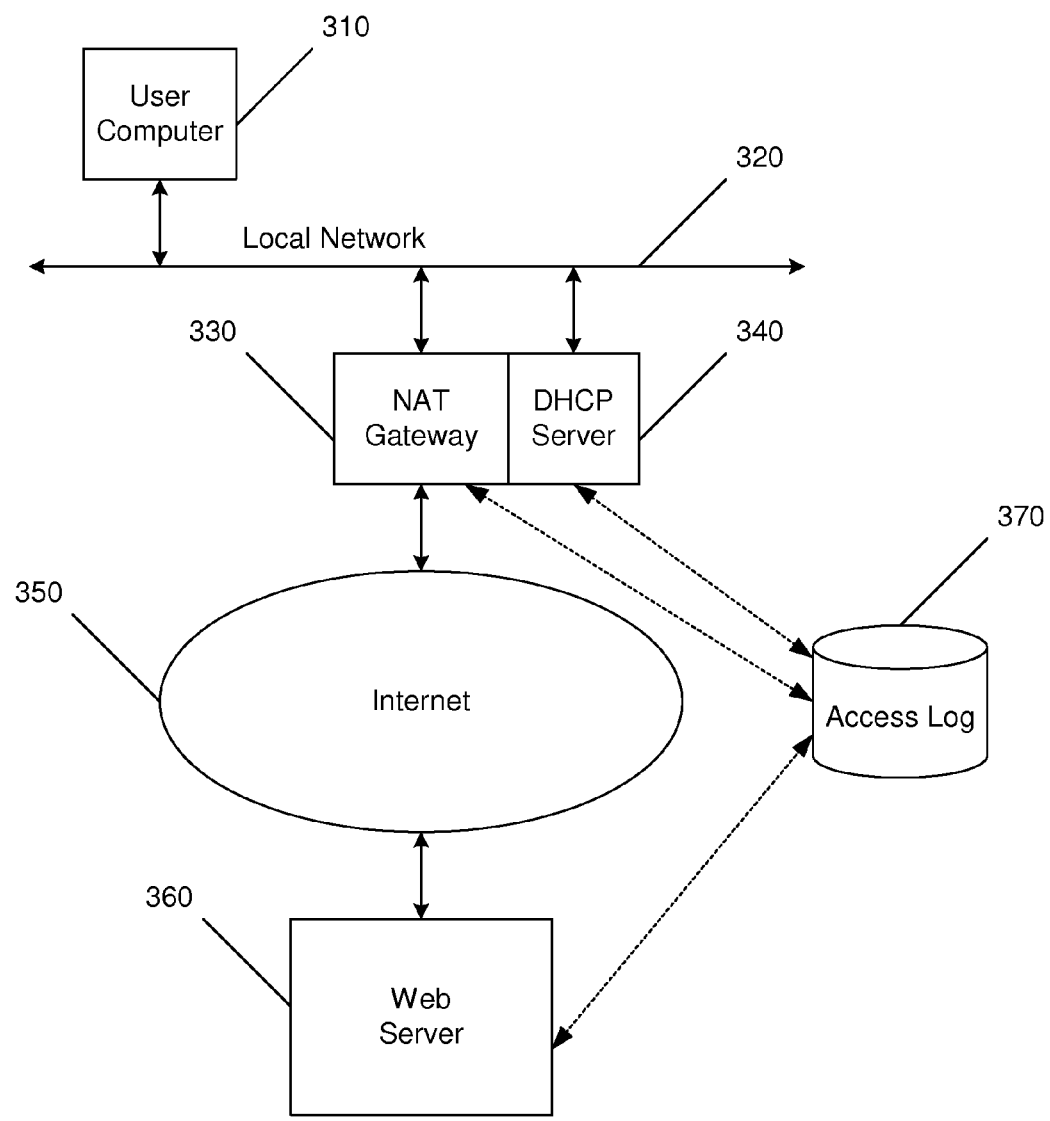
FIG. 3 illustrates activity logging in an embodiment of the present invention.

FIG. 3 illustrates activity logging in an embodiment of the present invention. User Computer 310 is connected to Local Network 320 which is connected to NAT Gateway 330 and DHCP Server 340. In most embodiments, NAT Gateway 330 and DHCP Server 340 will be implemented on the same physical machine and there will only be one network connection from that machine to Local Network 320. NAT Gateway 330 is coupled to the Internet 350, which is in turn coupled to Web Server 360. Access Log 370 receives information from Web Server 360, NAT Gateway 330 and DHCP Server 340. By combining information from all three sources as described in more detail below, activity logs can be generated that uniquely associate User Computer 310 with activity on Web Server 360.

Access Log 370 is shown in FIG. 3 as a single unit for illustrative purposes. The storage of activity data can be distributed across multiple machines and the physical location or locations of the log storage can vary. Web Server 360, NAT Gateway 330 and DHCP Server 340 can locally store activity information and then periodically transfer it to a central location, or in alternative embodiments the activity information may be transmitted immediately to a central repository. In still other embodiments, the activity information may never be stored together in one physical location but may be maintained separately and controlled by separate entitles. It will be appreciated to those of skill in the art that as long as the requisite information is recorded in some fashion, there are many alternatives to how, when and where the information is stored.

One feature of an embodiment of the present invention is that Web server activity can be associated with an individual user and/or an individual computer, through for example a MAC address. Every computer having an Ethernet interface in principle has a globally unique MAC address, which is a 48-bit address associated with the Ethernet interface and used as the source address for Ethernet frames transmitted from that interface. The MAC address is created by the manufacturer at the time the interface is created. Alternative identifiers can be used to uniquely identify a particular user or computer. For example, some central processing units (CPUs) have unique processor IDs that are created by the microprocessor manufacturer and are globally unique and cannot be changed by the user.

It will be appreciated to those of skill in the art that other forms of unique identifiers can be used, including a phone number, address, bank account number, credit card number, social security number, license plate number, or the like. It is also the case that the identifier need not uniquely identify the user or computer throughout the entire world. In certain embodiments it may only be necessary to identify the user or computer within a certain group or it may only be necessary to narrow down the user or computer into a relatively small group.

In order to associate the MAC address used by User Computer 310 with activity that occurs on Web Server 360, it is desirable to record the association between the MAC address used by User Computer 310 and an IP address allocated by DHCP server 340. Additionally, it is desirable to record the alias link between an internal and external IP address that is created by NAT Gateway 330. This is explained in more detail below.

Figure 4:
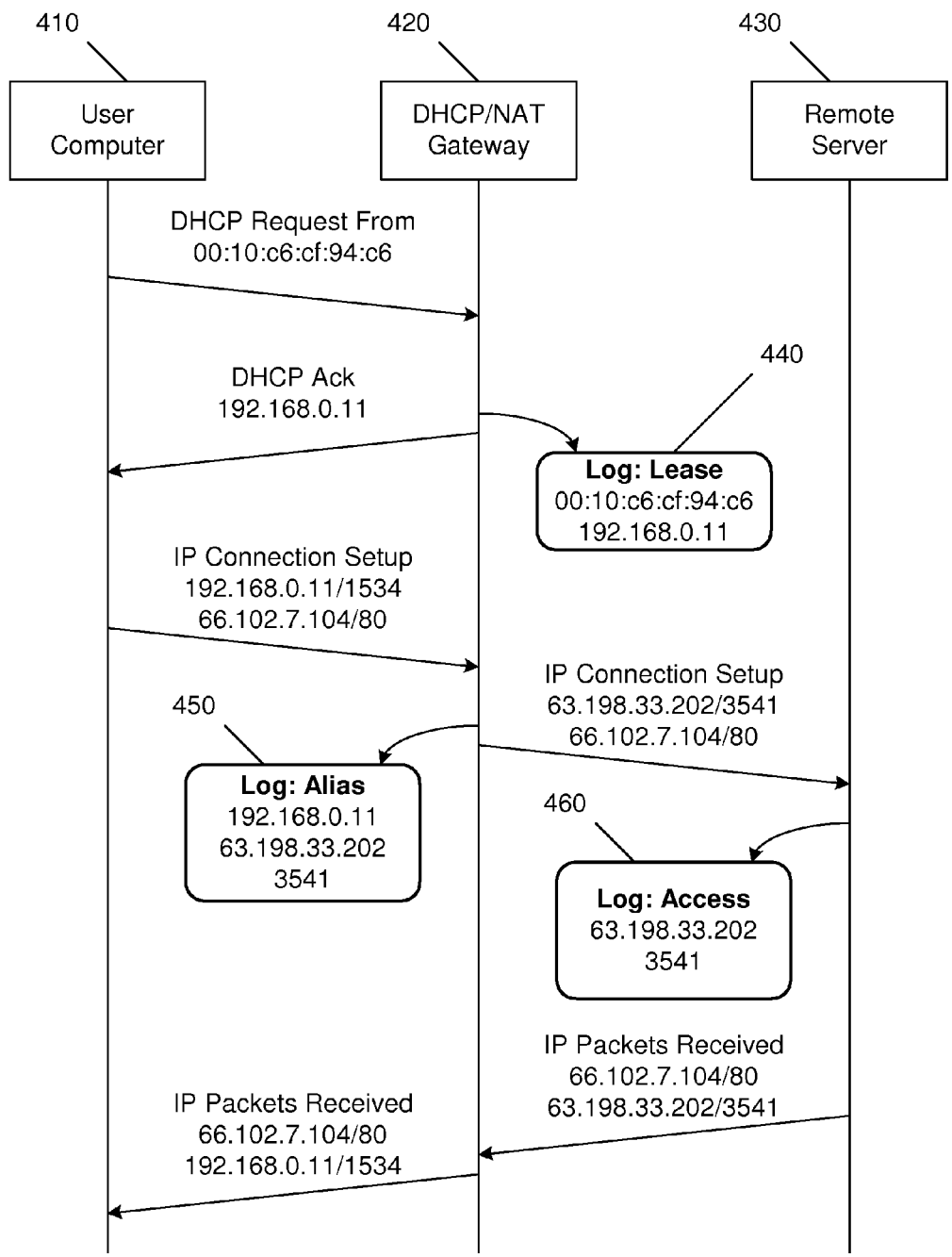
FIG. 4 illustrates communication and logging events in an embodiment of the present invention.

FIG. 4 illustrates communication and logging events in an embodiment of the present invention. User Computer 410 exchanges messages with DHCP/NAT Gateway 420, which in turn is coupled to Remote Server 430. FIG. 4 illustrates the types of information that are logged in an embodiment of the present invention in order to associate User Computer 410 with remote activity. When User Computer 410 is first connected to a local network on which DHCP/NAT Gateway 420 is also connected, it communicates with DHCP/NAT Gateway 420 in order to get an IP address to use. The DHCP protocol is typically used to perform this function, although there are alternative dynamic IP address allocation protocols that can be used. When a dynamic IP address is allocated to User Computer 410, this is known as a "lease" and will typically last for a defined period of time at which point it needs to be renewed through further exchange of messages.

FIG. 4 illustrates a simplified exchange of DHCP messages between User Computer 410 and DHCP/NAT Gateway 420 for illustrative purposes. Those of skill in the art will appreciate that the DHCP protocol involves other messages. In the example of FIG. 4, first User Computer 410, using the MAC address 00:10:c6:cf:94:c6 requests an IP address from DHCP/NAT Gateway 420. Next, DHCP/NAT Gateway 420 allocates dynamic IP address 192.168.0.11 to User Computer 410 and sends an acknowledgement message to User Computer 410 with this information. At this point, the lease of IP address 192.168.0.11 to MAC address 00:10:c6:cf:94:c6, illustrated by information block 440, is recorded. An actual sequence of DHCP messages that represents this exchange is typified by the following:

User→Server: DHCPDISCOVER from 00:10:c6:cf:94:c6

Server→User: DHCPOFFER on 192.168.0.11 to 00:10:c6:cf:94:c6

User→Server: DHCPREQUEST for 192.168.0.11 from 00:10:c6:cf:94:c6

Server→User: DHCPACK on 192.168.0.11 to 00:10:c6:cf:94:c6

The establishment of a "lease" represents the grant of an IP address to a particular machine identified by an Ethernet address. In this case the IP address granted is an internal, un-routable address, which can be used on a local network but cannot be used on the Internet. DHCP servers can typically be configured to allocate either internal or external IP addresses, and can allocate from a pool of IP addresses, or can be configured to associate particular IP addresses with particular MAC addresses.

An example of software that performs the DHCP functionality is the dhcpd daemon (a daemon is a computer program that runs in the background) that is a standard utility on many Unix systems. The dhcpd daemon is configured to listen on certain interfaces and to respond to broadcast messages from machines requesting IP addresses. Some implementations of dhcpd can be configured to automatically log the granting of leases and the expiration of leases. In one embodiment of the present invention, the dhcpd daemon is configured to generate this information, and/or is modified to transmit this information to another host, immediately or periodically.

The next sequence illustrated in FIG. 4 relates to network address translation (NAT). Because User Computer 410 is utilizing an un-routable IP address, this address needs to be translated to an external IP address before packets can be sent over the Internet. This is the job of the NAT gateway. The establishment of an association between an internal IP address and port number to an external IP address and port number is known as an "alias link." Because there may be many internal machines communicating with the same remote host, it may be necessary for the NAT gateway to change the port number from the one utilized by User Computer 410. Because TCP connections are uniquely identified by source and destination IP address and source and destination port numbers, multiple connections from the same IP address can be established to the same destination port number as long as the source port number is different for each connection.

In the example illustrated in FIG. 4, User Computer 410 sends a packet to set up a connection to a remote Web server at IP address 66.102.7.104, port 80. The source IP address for User Computer 410 is 192.168.0.11 and the source port number is 1534. Upon receiving the packet from User Computer 410, DHCP/NAT Gateway 420 establishes an alias link, rewrites the outgoing packet and sends it to the Internet. Because the un-routable address used by User Computer 410 is not usable on the Internet, the source address for the outgoing packet is replaced with the source address for DHCP/NAT Gateway 420, which in this example is 63.198.33.202. FIG. 4 illustrates that DHCP/NAT Gateway 420 associated port 3541 with User Computer 410 source port 1541. At this point the alias of source IP address 192.168.0.11 to external IP address 63.198.33.202, port 3541 is recorded, as illustrated by information block 450.

An example of software that performs NAT functionality is the natd daemon that is a standard utility in many Unix systems. In some implementations natd relies on a library known as libalias which performs the function of maintaining a table or database of IP number and port number associations. The libalias library code adds and deletes alias links as needed. In one embodiment of the present invention, the libalias library is modified to log certain alias links to a file and/or to transmit this information to another host, immediately or periodically.

The next sequence illustrated in FIG. 4 is the receipt of the packet by Remote Server 430 and the return of a packet to DHCP/NAT Gateway 420, which subsequently returns a packet to User Computer 410. Remote Server 430 could be a Web Server, an Email Server or any other server on the Internet for which activity logging is desired. In the example shown in FIG. 4, Remote Server 430, which is at IP address 66.102.7.104 receives a packet to port 80 from source IP address 63.198.33.202, port 3541. Remote Server logs the access as illustrated in information block 460.

Web server logging is well known the field and it is common for Web servers to log activity. A typical log entry consists of the source IP address and the document requested along with other information. The Apache HTTP Server, described above, defines a "Combined Log Format" that can be utilized to configure the Web server for what information is logged. An example entry in the Combined Log Format is shown below:

127.0.0.1—frank [10/Oct/2000:13:55:36-0700] "GET /apache_ pb.gif HTTP/1.0" 200 2326 "http://www.example.com/start.html" "Mozilla/4.08 [en] (Win98; I; Nav)"

The fields in this entry are as follows: 127.0.0.1 is the IP address of the client that made the request of the Web server, the dash is a null field in place of the RFC 1413 identity of the client, frank is the user ID of the person requesting the document as determined by HTTP authentication, the date field between brackets is the date and time that the request was received, the next field between quotes is the request that was received from the remote host, 200 is the status code that the Web server sent back to the client, 2326 is the size of the object returned to the client in number of bytes, the next field between quotes is the site that the client reports having been referred from, and the last field between quotes is the identifying information that the client browser reports about itself.

Note that a Combined Log Format entry such as illustrated above is not in general sufficient to uniquely identify an individual user. In particular, the source port number is not typically logged. Because many clients may be connecting to the Internet behind a single NAT gateway, in many circumstances the only way to distinguish an individual user is to log the source port number of the HTTP request. In a preferred embodiment of the present invention, the Web server software running on Remote Server 430 is modified to log the source port number of each HTTP request in addition to other information, and to send this information to a log file, and/or to transmit this information to another host, immediately or periodically. When the source IP address and source port number are correlated with the alias link information and with the IP to MAC address association, it is possible to associate a particular user with activity that occurs on a remote server.

Another form of Remote Server is an email server. A typical email transmission from a user to a recipient on the Internet involves a user's computer contacting a local SMTP relay on port 25, sending the email and closing the connection. Subsequently the local SMTP relay consults the DNS (domain name system) to determine the appropriate remote email relay for the domain name of each recipient of the email. If properly configured, the DNS zone for the destination domain will contain an "MX Record" which will specify the machine or machines on the Internet who will accept email for that domain. The local SMTP relay then contacts one of the machines indicated in the MX Record on port 25 and delivers the email message. Many if not most SMTP relays are configured to generate logs of sent and received email messages. The format of a log entry depends on the software used and the version of that software. A format for sendmail which is a software program that performs SMTP relay functions and is a standard component of many UNIX systems is shown below:

<date> <host> sendmail[pid]: <qid>: <what>=<value>, . . .

Included in each log entry is a date stamp, the name of the host generating the information, the process ID for the running process, a queue ID and a comma separated list of parameter/value pairs. One of the parameter/value pairs commonly logged is the name and IP address of the remote host the email is being received from or is being sent to. For example, an entry in a log file might contain the following parameter/value pair: "relay=floozy.zytek.com.[63.198.33.206]" indicating that email was received from the IP address 63.198.33.206, having the name floozy.zytek.com.

In some cases it may not be important to log more that just the IP address of the machine sending an email, since email relays typically receive email directly from other email relays, or from trusted users. However, for the same reasons noted above for Web servers, this information is not in general sufficient to specifically identify an individual computer. In particular, the source port number is not typically logged.

Because many clients may be connecting to the Internet behind a single NAT gateway, in many circumstances the only way to distinguish an individual computer is to log the source port number of the incoming SMTP connection. In a preferred embodiment of the present invention, the sendmail software running on Remote Server 430 is modified to log the source port number of each incoming SMTP connection in addition to other information, and to send this information to a log file, and/or to transmit this information to another host, immediately or periodically. When the source IP address and source port number are correlated with the alias link information and with the IP to MAC address association, it is possible to associate a particular computer with activity that occurs on a remote server.

In certain embodiments of the present invention, it may not be necessary to record the IP to MAC address association at the time the lease is generated by the DHCP Server. Instead, this information may potentially be generated at the same time the alias information is generated. This is because the packet that is received by the DHCP/NAT Gateway 420 may contain the source Ethernet address of User Computer 410. In this case, DHCP/NAT Gateway 420 can just look at the source Ethernet address and record this as the MAC address associated with the source IP address that is also in the packet. In this case, the information contained in information block 440 and the information contained in information block 450 are combined into a single entry created at the same time by DHCP/NAT Gateway 420. However this implementation is not always possible because in some embodiments, the source Ethernet address of the packet received by DHCP/NAT Gateway 420 is not the original source Ethernet address of User Computer 410. This could be the case if there are intervening routers or other devices between User Computer 410 and DHCP/NAT Gateway 420. There may also be situations, as discussed below, where multiple NAT gateways are employed between the user originating a packet and the machine that is ultimately responsible for delivering that packet to the Internet.

Figure 5:
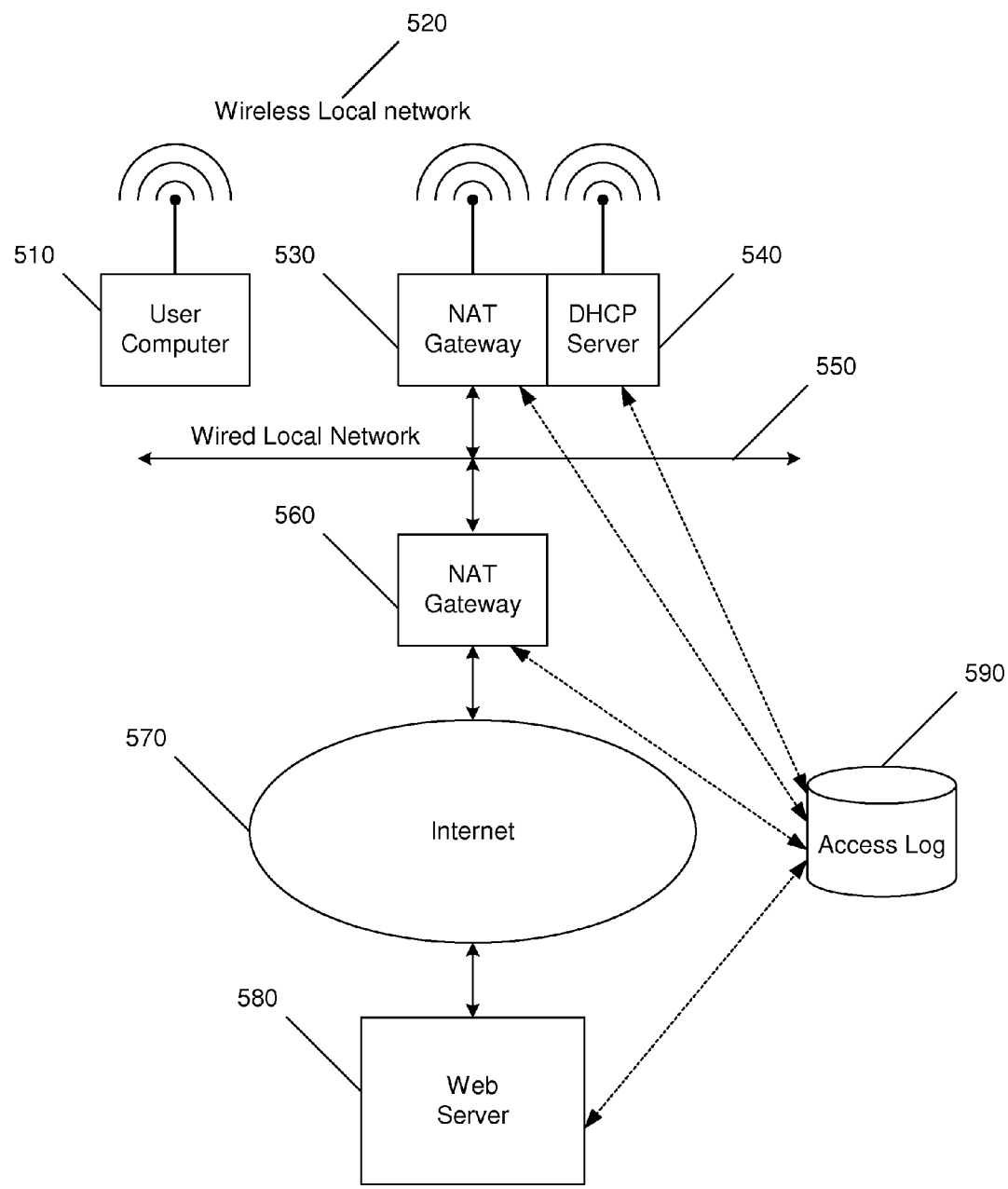
FIG. 5 illustrates activity logging in an embodiment of the present invention.

FIG. 5 illustrates activity logging in an alternative embodiment of the present invention. User Computer 510 is connected to Wireless Local Network 520 which is connected to NAT Gateway 530 and DHCP Server 540. In most embodiments, NAT Gateway 530 and DHCP Server 540 will be implemented on the same physical machine and there will only be one wireless network connection from that machine to Wireless Local Network 520. NAT Gateway 530 is connected to Wired Local Network 550, which is in turn connected to NAT Gateway 560. NAT Gateway 560 is coupled to the Internet 570, which is in turn coupled to Web Server 580. Access Log 590 receives information from Web Server 560, NAT Gateway 560, NAT Gateway 530 and DHCP Server 540. By combining information from all four sources as described in more detail below, activity logs can be generated that uniquely associate User Computer 510 with activity on Web Server 580.

The interconnection illustrated in FIG. 5 is more complicated than the interconnection illustrated in FIG. 3 because packets from User Computer 510 go through two NAT Gateways before reaching the Internet. This means that a first un-routable address may be used on Wireless Local Network 520, these packets may be translated into packets utilizing a second un-routable address and sent between NAT Gateway 530 and NAT Gateway 560. Finally, NAT Gateway 560 translates the packets from the second un-routable address to an external IP address for use on the Internet. Traceability back to User Computer 510 requires that the association between the user and the first un-routable IP address be recorded, that the alias link between the first and second un-routable addresses be recorded and that the alias link between the second un-routable address and the external IP address use by NAT Gateway 560 be recorded. The process of logging information in the interconnection of FIG. 5 is similar to that described above in connection with FIG. 3 and FIG. 4 with the addition of a second NAT Gateway.

As explained above, it may be possible for NAT Gateway 530 to record the alias link information as well as the MAC address to IP address association since it receives packets directly from User Computer 510. In this case, only two sources of information, NAT Gateway 530 and NAT Gateway 560 are needed to associate User Computer 510 with packets being transmitted on the Internet.

As explained above in connection with FIG. 3, Access Log 590 is shown as a single repository for illustrative purposes. The repository may be distributed and the correlation of the multiple pieces of information necessary to establish the identity of activity need not be actually performed until needed. For example, since the activity known to Web Server 580 is under the control of the entity operating the Web site or sites associated with Web Server 580, it may be stored separately from the other information. Similarly, the access information known to the NAT gateways and the DHCP servers are typically under the control of the entity who provides access of the user to the Internet, which may be a different entity from that operating Web Server 580.

In some cases, it may be sufficient that the information necessary to correlate a specific user with specific Internet activity is available if and when necessary. Thus, the actual correlation is not performed unless required. It may be the case that the entity providing access of a user to the Internet protects the alias link and IP lease information unless required to provide it by a Court or law enforcement official, or dictated by an internal investigation. In some cases the entity providing access of a user to the Internet may be required to preserve the alias link and IP lease information, either by laws governing the entity in whatever jurisdiction they operate, or by contract dictated by the Internet service provider they connect through.

One issue that can arise when logging MAC address to IP address associations, such as through a DHCP lease or other address allocation mechanism, is the validity of the MAC address or other identifying information that is utilized by the user. Some Ethernet interfaces can be re-programmed by the user to set the MAC address to an arbitrary value not set by the manufacturer. This facility would allow the user to masquerade as an arbitrary MAC address, which in some cases would defeat the purpose of uniquely identifying the machine and/or user that is connected. For example, a user wishing to remain completely anonymous could configure User Computer 510 to utilize an arbitrary MAC address and connect to Wireless Local Network 520, and subsequently to the Internet 570. The same is true of any ID number used to identify the user if the number can be selected arbitrarily by the user. One way to address this issue is to require identifying information to be validated.

In some cases of public access to the Internet, user authentication takes place at the application level where users must type in user names and passwords. In such a case, it can be relatively simple to associate MAC addresses in use and/or allocated IP addresses with individual users. In this case, the related user account can be logged along with the other access information, allowing for possible later association to an individual. In this case, it may not be necessary to validate the MAC address in use, since the user is being identified through other means. In cases where there is no explicit user identification, or where it is important to further validate the access information, identification validation can be performed. Identification validation is one aspect of an embodiment of the present invention and is described below.

The purpose of identification validation is to guarantee that an association can be made between access to and/or activity on a local or wide-area network such as the Internet and an individual user, location, piece of equipment, etc. There is usually a tradeoff between security and privacy in such circumstances. While the anonymity of certain types of access and activity on the Internet is desirable and important, for other types of access and activity, it is also desirable and important that individuals responsible can be identified. The use of a carefully designed identification authentication system can appropriately balance these competing concerns. For example, information sufficient to identify access or activity can be maintained, while safeguards can be put in place to ensure that only in specific cases (such as a Court Order or Subpoena) would the information be made available. In another example, this information could be placed in the hands of an independent third party, who would provide the information under specific guidelines.

Figure 6:
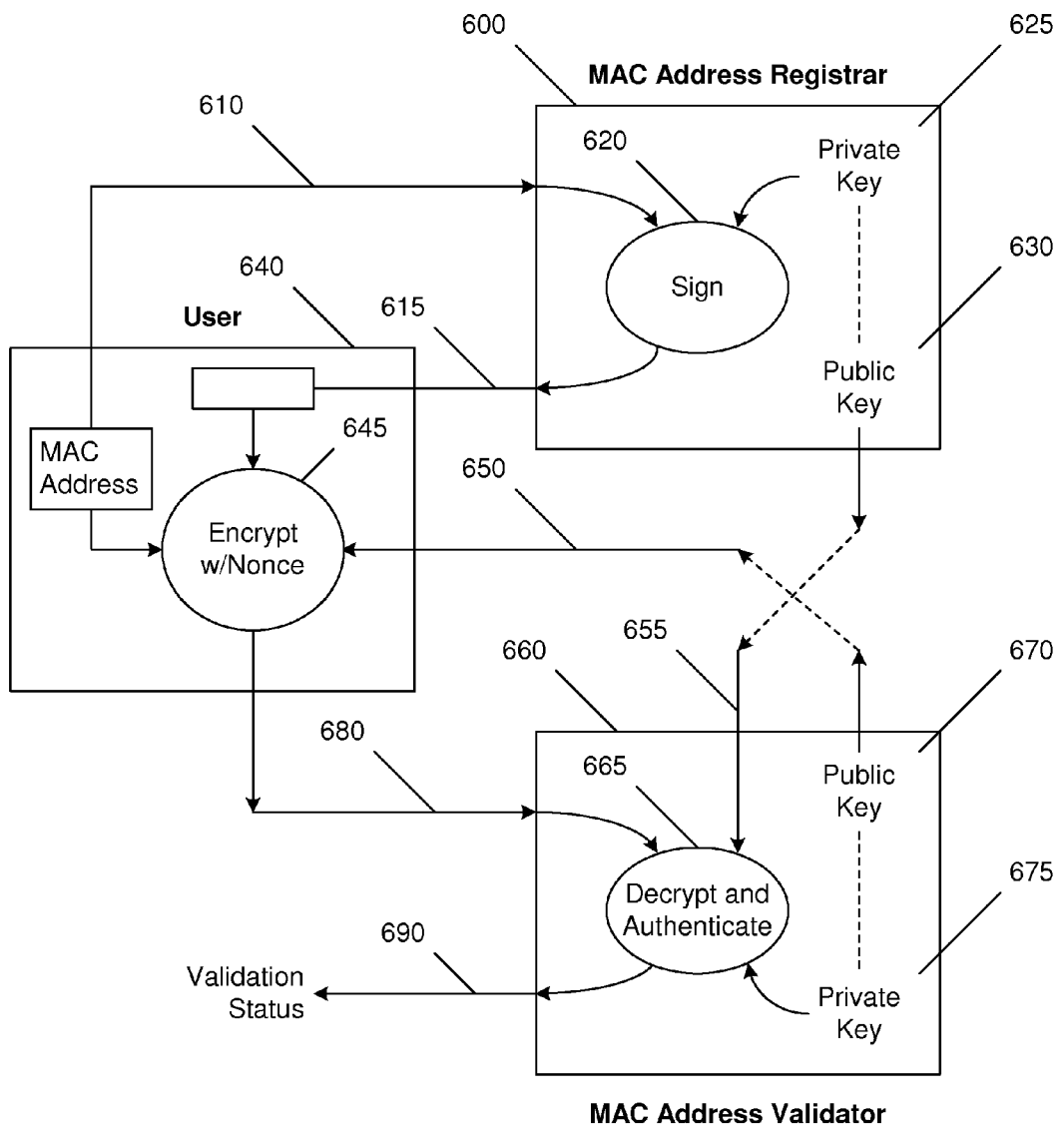
FIG. 6 illustrates MAC address registration and validation.

FIG. 6 illustrates MAC address registration and validation. MAC Address Registrar 600 is responsible for receiving a MAC address 610 and producing a signed version of the MAC address 615. MAC Address Validator 650 is responsible for receiving an encrypted and signed MAC address 680 and validating the MAC address to generate a validation status 690. The registration/validation process of the present invention is based on the use of public key cryptography. Public key cryptography is based on a matched pair of keys, one used to encode information and one used to decode information. By keeping one of the matched keys private and making the other public, the functions of authentication and encryption can be realized.

MAC Address Registrar 600 receives a MAC address 610 and signs it at 620 and produces a signed MAC address 615. The Sign function 620 utilizes a Private Key 625 of MAC Address Registrar 600. The use of a private key accomplishes the function of authentication since one can verify using Public Key 630 that the signed MAC address was produced by MAC Address Registrar 600. The mathematics of the matched key pairs make it computationally infeasible to generate Private Key 625 knowing only Public Key 630. Thus, it is impractical to generate a signed MAC address 615 without access to Private Key 625. This means that Private Key 625 should be maintained in confidence by MAC Address Registrar 600. There need not be a single MAC Address Registrar, but in embodiments of the present invention there may be many. Indeed any entity responsible for granting access to the Internet may chose to maintain a separate MAC Address Registrar.

An Ethernet MAC address is 48-bits in length. The purpose of a MAC Address Registrar 600 is to associate a MAC address with a known user, and potentially to verify the MAC address based on other criteria. This may be done, for example, by referring to the manufacturer and model of the hardware in use, by consulting a database of known MAC addressees, or by consulting a database of registered MAC addresses. Once the MAC address provided to the Registrar is verified, a signed version of the MAC address is generated. Because an arbitrary MAC address is usable to someone who can reprogram their Ethernet adaptor, any signed MAC address would be usable to someone wishing to bypass the MAC address registration process. This means that it is desirable for MAC Address Registrar 600 to utilize enough bits in its signature so that it is impractical to guess signed MAC addresses even for arbitrary MAC addresses. The analysis needed to determine the number of bits needed to guarantee a certain level of impracticality based on available computational resources is known to those of skill in the art.

User 640 is responsible for delivering MAC Address 610 to MAC Address Registrar 600 and for saving the signed version of the MAC Address 615. Preferably the transmission of the signed MAC Address 615 occurs over a secure channel. This is because if someone eavesdrops on this process, they could masquerade as User 640 by utilizing the MAC Address and signed MAC Address. A variety of techniques are possible to secure the transmission of signed MAC Address 615 to User 640. In some embodiments, this process may occur over a private network. MAC Address Registrar 600 may be operated by an equipment manufacturer, distributor or reseller and may register MAC Address 610 before delivering it to a user. In other embodiments, an HTTP SSL connection is utilized to transfer Signed MAC Address 615 over an encrypted connection between MAC Address Registrar 600 and User 640. It is appreciated by those of skill in the art that there are a variety of other techniques to securely transfer the Signed MAC Address 615 across a public network. Once Signed MAC Address 615 is delivered to User 640, it is ideally stored in a manner inaccessible to unauthorized software running on the user's machine. This is needed to prevent malware running on the user's computer from retrieving the signed MAC address so that it could masquerade as the user. There are a variety of ways to accomplish this secure storage, including the use of passwords and additional encryption. In an alternative embodiment, Signed MAC Address 615 is stored internal to an embedded microcontroller, such as on a smart card or within an Ethernet adapter. In this case, once the embedded system is programmed with the signed MAC address, the address cannot be retrieved through an analysis of software and storage on the user's computer.

The validation process depicted in FIG. 6 begins with the use of a Public Key 670 of MAC Address Validator 660 delivered to User 640 at input 650. The use of public key encryption during the validation process guarantees that the Signed MAC Address 615 is not intercepted by an eavesdropper. This would allow such an eavesdropper to masquerade as User 640. In one embodiment, Public Key 670 is delivered over a secure channel to User 640. This is desirable to avoid a Man-In-The-Middle attack, in which an intermediary intercepts Public Key 670 and replaces it with their own public key. In some embodiments, Public Key 670 is delivered to User 640 at the same time as Signed MAC Address 615 by MAC Address Registrar 600. This may be convenient in situations where MAC Address Registrar 600 is operated by the same entity that operates MAC Address Validator 660. In this case, Public Key 670 could be stored in the same manner as Signed MAC Address 615, including on a smart card if such a facility is used. In another embodiment, Public Key 670 is signed by a known Certificate Authority, the public key for which is previously known to User 640. In this manner, User 640 can verify that the public key being input at 650 is indeed the public key for MAC Address Validator 660. Those of skill in the art will appreciate that there are alternative mechanisms to deliver a public key to User 640 and to authenticate MAC Address Validator 660. In order to protect the confidentiality of Signed MAC Address 615, it is important to ensure that User 640 only encrypts it with keys from entities authorized to receive it.

In order to prevent a "replay" attack, in which an eavesdropper listens to the transmission of an encrypted signed MAC address, it is useful to combine the signed MAC address with a number used once or "nonce." An example of nonce is a time stamp of sufficient length and granularity. Another possible implementation would be for MAC Address Validator 660 to generate a random number internally and send it to User 640 for combination with the signed MAC address. When MAC Address Validator receives the encrypted and signed MAC address at 680, decryption and authentication is performed in box 665 using Private Key 675 and Public Key 630, received at input 655, and a validation status 690 is produced. MAC Address Validator 660 utilizes Public Key 630 of MAC Address Registrar to authenticate the MAC Address. In a preferred embodiment, the delivery of Public Key 630 to MAC Address Validator 660 occurs on a secure channel, to prevent an attack in which a signed MAC address is faked according to keys not belonging to MAC Address Registrar 600. In some embodiments, MAC Address Registrar and MAC Address Validator are co-located and operated by the same entity.

The above description has been with regard to MAC addresses, but it equally applies to any form of identification that can be represented in digital form. The functions described with respect to User 640 can be performed by hardware or software or any combination. These functions may be implemented by software running on a user's computer, workstation, portable hand-held computer or cell phone. The functions may also be performed by dedicated hardware and firmware, such as in a smart card. In some embodiments, some or all of the functionality described in connection with User 640 is built into a network interface card by the manufacturer and transparent to the user. For example, an Ethernet card could be pre-registered with Signed MAC Address 615 and Public Key 670 could be pre-installed. In order to validate, the Ethernet card merely encrypts the signed MAC address with a timestamp and makes it available to higher level software, which can then include this number during DHCP registration. In this case the validation of the MAC address is completely transparent to the user and would not affect implementations that do not rely on this feature. In some embodiments the encrypted and signed MAC address could be made part of the DHCP protocol, in which case the DHCP server could be modified to communicate with MAC Address Validator 660 before granting an IP address lease.

In an alternative embodiment, a different protocol could be used after an IP address lease but before packets are accepted by the NAT gateway. For example, an encrypted and signed MAC address could be sent to a machine on the local network on which it is installed, or the NAT gateway responsible for that network could accept the encrypted and signed MAC address and communicate with MAC Address Validator 660 before granting the opportunity to forward other packets.

In other embodiments, a user may carry a portable smart card that can be used for authentication for use with any computer. In this case the actual MAC address used by the computer is not used for user authentication, but instead other identifying information that has been previously registered.

In the embodiments of the present invention discussed in connection with FIGS. 3, 4 and 5 above, it was illustrated how logging information can be generated sufficient to allow individual computers to be identified. The discussion in connection with FIG. 6 illustrates how computer or user identification can be validated. In one embodiment, the validation status 690 generated by MAC Address Validator 660 is logged along with the lease information such as that contained in information block 440. A DHCP server, or other entity responsible to associating MAC addresses with IP addresses, could be modified to require additional information from a client computer and validate that the MAC address in use has been properly registered. Note that NAT/DHCP Gateway 420 need not know anything about the user or have access to the registration information, but merely needs to know from MAC Address Validator 660 that the MAC address in use by Client Computer 410 is valid. In this case, Validation Status 690 is merely an affirmative result transmitted to a DHCP Server or NAT Gateway. DHCP/NAT Gateway could then log an authorization code or an authentication string to prove that validation had been performed. In other embodiments, identification validation is done at the time an alias link is created and logged in connection with information such as that contained in information block 450.

One issue that arises with the storage of access and activity logs is the convenient and efficient maintenance of those logs. As noted above, the use of logs often involves a balance between security and privacy. Entities that provide access to the Internet, and entities that make content and services available on the Internet, often have the triple responsibilities of (1) maintaining privacy, (2) maintaining the integrity of the services being provided, and (3) complying with all applicable laws regarding the disclosure of information. To fulfill the responsibility of maintaining privacy, the entity would ideally log as little information as possible. Any information maintained represents a liability to the entity generating the information in this regard since it represents a risk of disclosure and possible compromise of privacy.

To fulfill the second responsibility of maintaining the integrity of the services being provided, the entity needs to log certain types of information for certain periods of time. For example, enough information should be maintained long enough so that abuse can reasonably be detected over a reasonable period of time. Additionally, billing requirements may require certain information be maintained. This responsibility does not necessarily mean complete logs must be maintained. In certain cases, the entity only needs summary information, and/or only needs to maintain the information for a limited period of time. For example, an entity proving access to the Internet may want to maintain for over a year the number of minutes connected on a certain day, while the specific IP address in use on that day and the specific port numbers used may only be needed for days or weeks.

The third responsibility is to comply with all applicable laws for the jurisdiction under which the entity operates. In some cases, there are no laws that require the preservation of logging information, in which case the logged information would be governed by other concerns. In other cases regulations may require that certain types of information may be maintained for a specific period of time. Another type of legal responsibility that arises in certain circumstances is not a requirement a priori that certain information be maintained, but that all information that is under the custody or control of the entity is produced at the time a subpoena is received. Since responding to subpoenas is expensive and time consuming, it is most efficient to maintain custody and control only of that information that is required for business reasons or legal reasons.

Thus, it can be seen that there is a balance in what information is logged, how it is accessed and for how long it is maintained, and it is most cost effective for an entity that generates logging information to carefully design a system that appreciates the conflicting goals. In many cases maintaining complete logs indefinitely is not an efficient or appropriate mechanism for maintaining these multiple responsibilities. In such circumstances, it may be desirable to have a remote log repository that is outside the direct control of entity that generated the logs and is outside the jurisdiction of entities that may require disclosure of information.

Figure 7A:
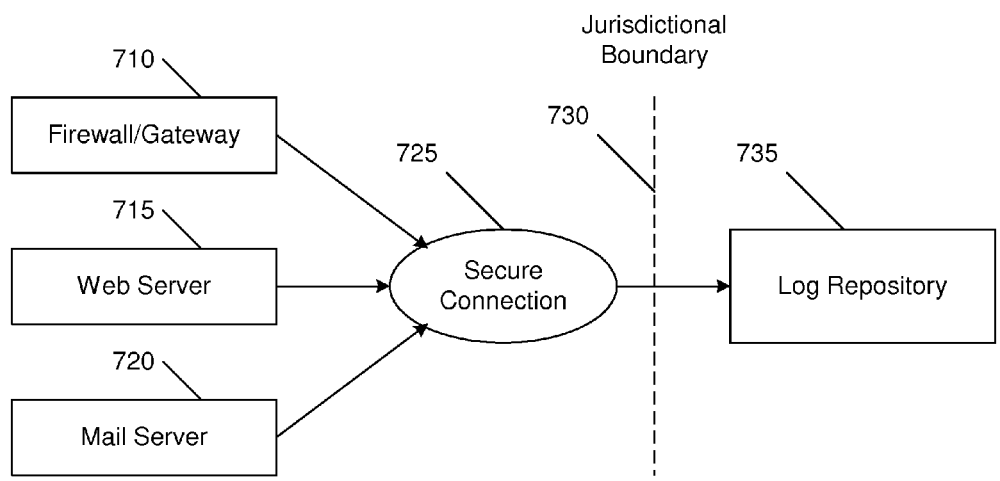
FIG. 7A illustrates remote logging across a jurisdictional boundary.

FIG. 7A illustrates an embodiment of a remote log repository. Access logs, such as those described above are generated by Firewall/Gateway 710 and delivered across secure connection 725 to Log Repository 735. Similarly Web Server 715 generates Web activity logs and Mail Server 720 generates email activity logs and delivers them across Secure Connection 725 to Log Repository 735. In certain embodiments of the present invention, Log Repository is across Jurisdictional Boundary 730 from the machines that generated the logs. Logging information may or may not be combined, and may involve only one type of information, for example, just access logs from Firewall/Gateway 710 or just activity logs from Web Server 715. Logging information may be encrypted for transport across Secure Connection 725 and may be further encrypted for storage at Log Repository 735 as described in more detail below. Logging information is also preferably compressed before being encrypted. Logging information is typically highly compressible, resulting in savings in transmission bandwidth.

The transmission of information from Firewall/Gateway 710, Web Server 715 and/or Mail Server 720 to Log Repository 735 may be immediate or periodic. For example, information may be compressed hourly or daily and transmitted to Log Repository 735. In a preferred embodiment, there is no local permanent storage of log information by Firewall/Gateway 710, Web Server 715 or Mail Server 720, or alternatively any permanent storage of such data is periodically deleted. The strict adherence to this policy allows the entity operating the log generating computers to establish that all of the information associated with access or activity is stored in Log Repository 735. In other embodiments, this is not critical and the log generating computers may store the logs locally in addition to transmitting them to Log Repository 735.

Figure 7B:
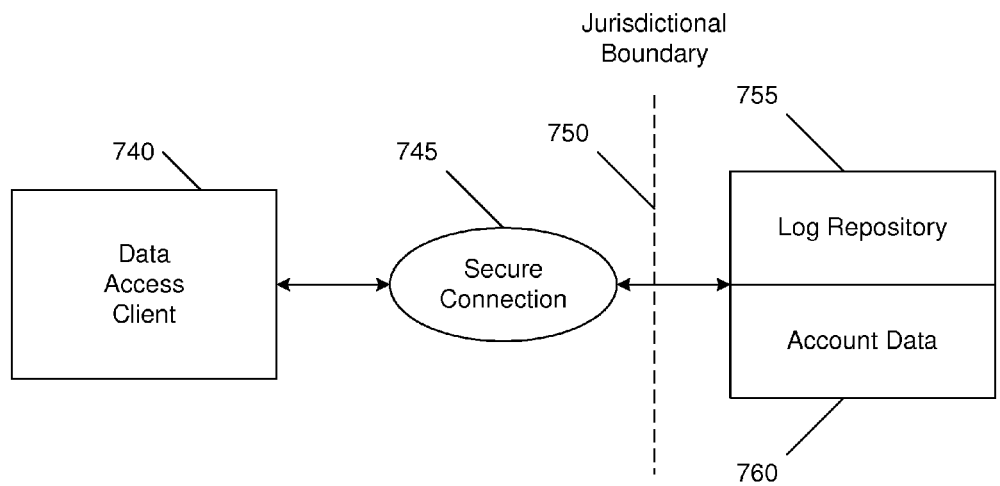
FIG. 7B illustrates remote access to log information across a jurisdictional boundary.

FIG. 7B illustrates access to Log Repository 755 by Data Access Client 740 across Secure Connection 745. In some embodiments, Account Data 760, which records information such as MAC Address Registration information or other information associated with users or accounts, is stored along with Log Repository 755. In certain embodiments of the present invention, Log Repository 755 and Account Data 760 are stored across Jurisdictional Boundary 750 from the machines that access the information. Data Access Client 740 and the communication between Data Access Client 740 and Log Repository 755 and Account Data 760 are carefully designed to satisfy the needs of the entities involved. In some cases, Log Repository 755 stores raw log information but Data Access Client only has access to summary information. In other cases, logged information may be summarized before it is stored in Log Repository 755. In still other cases, logged information may be maintained in complete form for a certain period of time, and then summarized for further storage for a second period of time. The method of accessing Log Repository 755 by Data Access Client 740 can also be designed such that after a certain period of time, information is no longer available. This feature removes the burden from the log generating entity to delete previously stored information. This means that in cases where information is requested (e.g. via subpoena) that is outside the bounds of the access policy that has been specifically provided to Data Access Client 740, it becomes trivial for the log generating entity to prove that it has no responsive documents. Thus, by carefully designing the data access policy, an entity generating log information can achieve an optimal and most cost effective balance between having access to information needed for business purposes and complying with all applicable laws.

Figure 8A:
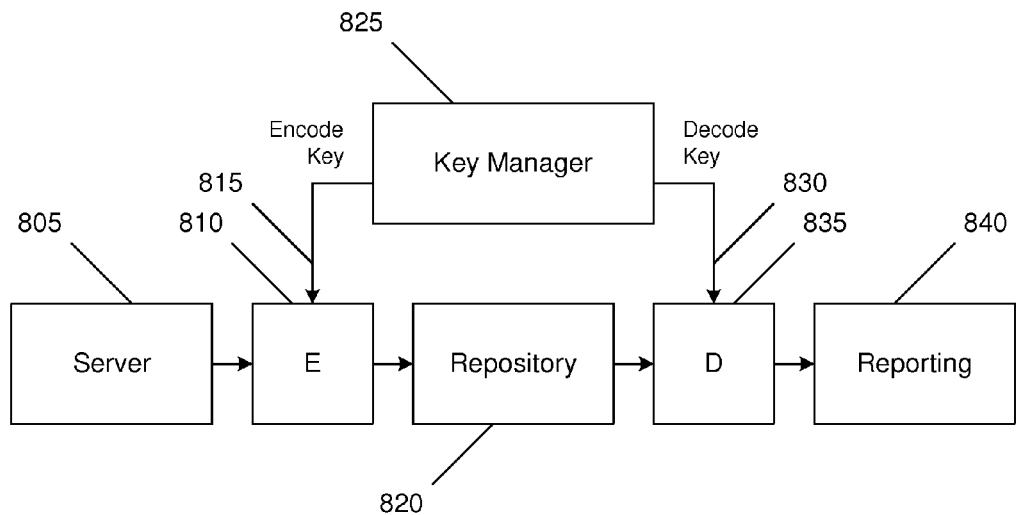
FIG. 8A illustrates encryption and decryption management for remote logging and reporting.

In order to provide for the protection of information stored in a remote log repository, a variety of flexible encryption options are possible. FIG. 8A illustrates an encryption scenario in which Key Manger 825 generates a matched Encode Key 815 and Decode Key 830, using techniques such as are well known in the field of public key cryptography. Server 805 generates logging information, encoding of that information takes place in Box 810, and the encoded information is stored in Repository 820. The encoding process 810 can take place at Server 805, at Repository 820, or at an intermediary machine (not shown). During data access, the encoded log information is decoded by Box 835 using Decode Key 830 and delivered to Reporting system 840, such as the Data Access Client 740 described in connection with FIG. 7B. The data decoding process 835 can be performed at Repository 820, at Reporting system 840, or at an intermediary machine (not shown). The Key Manager 825 may be operated by the entity or entities generating the logs, by the entity or entities having access to the logs (if different), or by another entity, such as a third party or a government agency. The encoding and decoding illustrated in FIG. 8A may be employed on top of encryption mechanisms utilized to transmit the information securely between the Server 805 and Repository 820 and between Repository 820 and Reporting System 840.

Figure 8B:
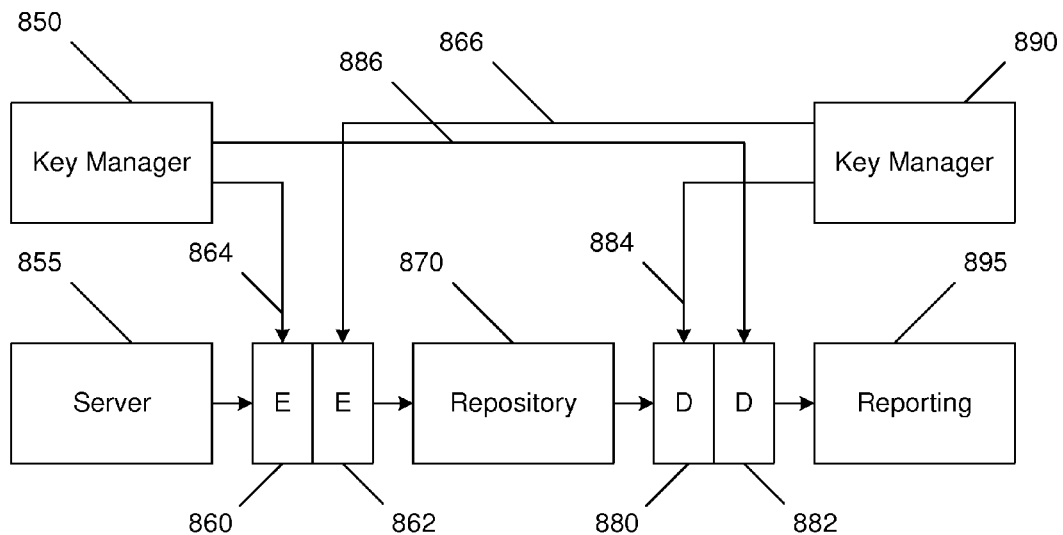
FIG. 8B illustrates an alternative embodiment of encryption and decryption management for remote logging and reporting.

An alternative embodiment of encoding and decoding of logging information is illustrated in FIG. 8B. Server 855, Repository 870 and Reporting system 895 are operated in substantially the same way as Server 805, Repository 820 and Reporting system 840 described above in connection with FIG. 8A. FIG. 8B utilizes two key managers, Key Manager 850 and Key Manager 890 for generating pairs of encode and decode keys. Key Manager 850 generates encode key 864 and decode key 886 and Key Manager 890 generates encode key 866 and decode key 884. Log information from Server 855 is encoded with both encode keys, first with encode key 864 at box 860 and then with encode key 866 at box 862. The encoding processes 860 and 862 can take place at Server 855, at Repository 820, or at an intermediary machine (not shown). Additionally, encoding process 860 may take place in one location and encoding process 862 may take place at a different location.

During data access, the encoded log information is decoded first at box 880 using decode key 884, then at box 882 using decode key 886 and then delivered to Reporting system 895. The data decoding processes 880 and 882 can be performed at Repository 870, at Reporting system 895, or at an intermediary machine (not shown). Additionally decoding process 880 may take place at one location and decoding process 882 may take place at a different location. Key Managers 850 and 890 may be operated by the entity or entities generating the logs, by the entity or entities having access to the logs (if different), or by another entity, such as a third party or a government agency. Additionally, different entities may operate Key Manager 850 and 890. For example, Key Manager 850 may be co-located with Server 855 and Key Manager 890 may be co-located with Reporting system 895. In the case that encode key 866 and decode key 886 are considered "public" keys and encode key 864 and decode key 884 are considered "private" keys, then the embodiment of FIG. 8B accomplishes both authentication and encryption of log information stored in Repository 870. The embodiment of FIG. 8B allows information to be protected even when multiple entities are involved in the generation, maintenance and utilization of the information. Those of skill in the art will appreciate that there are many alternative schemes for encrypting and authenticating the data that is stored the remote repository.

In one embodiment of the present invention, encode/decode key pairs 815/830, 864/886 and 866/884 are designed to be newly generated periodically. For example Key Manager

825, 850 and 890 could generate new key pairs every day and distribute them as appropriate. This would allow information to be easily made inaccessible by deleting the decryption keys. For example, by destroying decryption key 884 and all copies, the information associated with that day can be effectively deleted. The same key management policy can be employed to group other information, such as according to groups of users, kinds of activity, etc. The application of a decryption key destruction policy to enforce specific data access specifications can be used in addition to or instead of a repository access policy as was described above in connection with Data Access Client 740.

The present invention has been described above in connection with several preferred embodiments. This has been done for purposes of illustration only, and variations of the inventions will be readily apparent to those skilled in the art and also fall within the scope of the invention.

The invention claimed is:

1. A computer implemented method for logging network activity comprising:
    identifying a code to represent a network adapter coupled to a first network;
    storing first data, wherein the first data is based at least in part on a first association between the code and a first IP address that has been allocated on the first network;
    dynamically translating from the first IP address for use on the first network to a second IP address for use on a second network;
    storing second data, wherein the second data is based on an establishment of a network address alias, wherein the network address alias includes the first IP address used on the first network and a first IP port number used on the second network;
    transmitting, by at least one source computing device, a request to a destination server via the second network, wherein the destination server is associated with a destination IP address and a destination port number, wherein the request originated from the network adapter and identifies the first IP port number used on the second network, and wherein the first IP port number used on the second network corresponds to a source IP port number used on the second network for the request;
    receiving third data at the at least one source computing device from the destination server, wherein receipt of the third data is responsive to the request from the at least one source computing device, wherein the third data is associated with a first historical log entry initially stored by the destination server, and wherein the first historical log entry includes identification of the source IP port number for the request and information corresponding to activity at the destination server associated with the request; and
    determining a second association between the activity at the destination server associated with the request and the code representing the network adapter from which the request originated based at least in part on the first data, the second data, and the first historical log entry initially stored by the destination server.

2. The method of claim 1, wherein the code comprises a 48-bit Ethernet Media Access Control (MAC) address.

3. The method of claim 1, wherein the network address alias further comprises the second IP address used on the second network and a second IP port number used on the first network.

4. The method claim 1, wherein the first historical log entry includes a URL.

5. The method of claim 1, wherein the first historical log entry includes a user id determined by http authentication.

6. The method of claim 1, wherein the first historical log entry includes the http status code sent back to the at least one source computing device.

7. A computer system for logging network activity comprising:
    a network adapter attached to a first network having a code;
    means for storing first data, wherein the first data is based at least in part on a first association between the code and a first IP address that has been allocated on the first network;
    means for dynamically translating from the first IP address for use on the first network to a second IP address for use on a second network;
    means for storing second data, wherein the second data is based at least in part on an establishment of a network address alias, wherein the network address alias includes the first IP address used on the first network and a first IP port number used on the second network;
    means for transmitting, by at least one source computing device, a request to a destination server via the second network, wherein the destination server is associated with a destination IP address and a destination port number, wherein the request originated from the network adapter and identifies the first IP port number used on the second network, and wherein the first IP port number used on the second network corresponds to a source IP port number used on the second network for the request;
    means for receiving third data at the at least one source computing device from the destination server, wherein receipt of the third data is responsive to the request from the at least one source computing device, wherein the third data is associated with a first historical log entry initially stored by the destination server, and wherein the first historical log entry includes identification of the source IP port number for the request and information corresponding to activity at the destination server associated with the request; and
    means for determining a second association between the activity at the destination server associated with the request and the code representing the network adapter from which the request originated based at least in part on the first data, the second data, and the first historical log entry initially stored by the destination server.

8. The system of claim 7, wherein the code comprises a 48-bit Ethernet Media Access Control (MAC) address.

9. The system of claim 7, wherein the network address alias further comprises a second IP address used on the second network and a second IP port number used on the first network.

10. The system of claim 7, wherein the first historical log entry includes a user id determined by http authentication.

11. A computer system for logging network activity, the system comprising:
    a network adapter having a code attached to a first network;
    a first computing apparatus configured to store first data, based at least in part on a first association between the code and a first IP address that has been allocated on the first network;
    a first translation apparatus configured to dynamically translate from the first IP address for use on the first network to a second IP address for use on a second network;
    a second computing apparatus configured to store second data based at least in part on an establishment of a network address alias by the first translation apparatus, wherein the network address alias includes the first IP address used on the first network and a first IP port number used on the second network;

means for transmitting, by at least one source computing device, a request to a destination server via the second network, wherein the destination server is associated with a destination IP address and a destination port number, wherein the request originated from the network adapter and identifies the first IP port number used on the second network, and wherein the first IP port number used on the second network corresponds to a source IP port number used on the second network for the request;

means for receiving third data at the at least one source computing device from the destination server, wherein receipt of the third data is responsive to the request from the at least one source computing device, wherein the third data is associated with a first historical log entry initially stored by the destination server, and wherein the first historical log entry includes identification of the source IP port number for the request and information corresponding to activity at the destination server associated with the request; and means for determining a second association between the activity at the destination server associated with the request and the code representing the network adapter from which the request originated based at least in part on the first data, the second data, and the first historical log entry initially stored by the destination server.

12. The system of claim 11, wherein the first historical log entry includes a URL.

13. The system of claim 11, wherein the first historical log entry includes the http status code sent back to the at least one source computing device.

* * * * *

UNITED STATES PATENT AND TRADEMARK OFFICE
CERTIFICATE OF CORRECTION

PATENT NO. : 8,301,753 B1  
APPLICATION NO. : 11/426687  
DATED : October 30, 2012  
INVENTOR(S) : Melvin Page 1 of 1

It is certified that error appears in the above-identified patent and that said Letters Patent is hereby corrected as shown below:

On the title page, item (56), under "OTHER PUBLICATIONS", in Column 2, Line 1, delete "al." and insert -- al., --, therefor.

On the title page, item (56), under "OTHER PUBLICATIONS", in Column 2, Line 2, delete "Server." Jan. 4, 2002." and insert -- Server," Jan. 4, 2002, --, therefor.

In Column 4, Line 50, delete "cf:94:c6" and insert -- cf:94:c6. --, therefor.

In Column 5, Line 67, delete "NaV)"" and insert -- NaV)". --, therefor.

In Column 6, Line 61, delete "that" and insert -- than --, therefor.

In Column 9, Line 59, delete "addressees," and insert -- addresses, --, therefor.

In Column 15, Line 66, in Claim 4, delete "method" and insert -- method of --, therefor.

Signed and Sealed this  
Second Day of April, 2013

Teresa Stanek Rea  
*Acting Director of the United States Patent and Trademark Office*